United States Patent
Saito et al.

[15] 3,670,052
[45] June 13, 1972

[54] THERMOPLASTIC VINYL RESIN COMPOSITIONS, AND METHOD OF MANUFACTURE

[72] Inventors: Kazuo Saito, Syracuse, N.Y.; Takeshi Tanaka; Ichiro Saito, both of Osaka, Japan

[73] Assignee: Kanegafuchi Chemical Industry Company Limited, Osaka, Japan

[22] Filed: June 27, 1969

[21] Appl. No.: 837,309

Related U.S. Application Data

[63] Continuation-in-part of Ser. Nos. 470,235, Aug. 7, 1965, abandoned, and Ser. No. 502,545, Oct. 22, 1965, abandoned.

[30] Foreign Application Priority Data

| Jan. 25, 1965 | Japan | 40/3925 |
| Jan. 25, 1965 | Japan | 40/3927 |

[52] U.S. Cl. .................. 260/876 R, 260/29.7 UP, 260/880 R
[51] Int. Cl. ...................................... C08f 19/08, C08f 41/12
[58] Field of Search .......................................... 260/876, 880

[56] References Cited

UNITED STATES PATENTS

| 3,287,443 | 11/1966 | Saito et al. | 260/876 |
| 3,288,886 | 11/1966 | Himei et al. | 260/876 |
| 3,296,339 | 1/1967 | Feuer | 260/879 |

*Primary Examiner*—Samuel H. Blech
*Assistant Examiner*—Helen W. Roberts
*Attorney*—Synnestvedt & Lechner

[57] ABSTRACT

Production of synthetic vinyl resins having pronounced resistance to color deterioration, while also manifesting high impact strength and transparency, utilizing a butadiene graft polymer formed by the sequential addition to a polymer or copolymer of butadiene of from 80 to 30 parts of monomers for each 100 parts of total resin content, said monomers consisting of from 5 to 80 percent vinyl aromatic compound, from 5 to 50 percent of methyl methacrylate, and from 5 to 60 percent of acrylonitrile, the process being characterized in that at least 80 percent of the butadiene particles at the start are less than 0.1 $\mu$ in diameter and are dispersed in an aqueous emulsion which contains from 0.5 to 10.0 parts of a formaldehyde sulfoxylic salt, and catalytically effective amounts up to three parts of peroxide, for each 100 parts of resinous constituents used, said particle size being maintained at least until polymerization of the monomeric material has been effectively begun, said butadiene graft polymer being independently useful but also being capable of blending with a resin of the vinyl chloride type to produce a final resin of greatly enhanced properties.

10 Claims, No Drawings

THERMOPLASTIC VINYL RESIN COMPOSITIONS, AND METHOD OF MANUFACTURE

This application is a continuation-in-part and consolidation of our applications Ser. No. 470,235, filed July 7, 1965, and Ser. No. 502,545, filed Oct. 22, 1965, both now abandoned. Both applications claim priority from Jan. 25, 1965, on which date corresponding applications were filed in Japan.

The present invention relates primarily to thermoplastic vinyl resin compositions, and is especially concerned with the imparting to such resins of a high degree of impact resistance, transparency, and resistance to color deterioration. One aspect of the invention is concerned with the preparation of a butadiene-vinyl resin graft polymer in such a manner as to manifest the properties mentioned to a significant degree, thus producing a thermoplastic resin composition which is independently useful. The butadiene-vinyl graft polymer so produced can be effectively blended with a resin of the polyvinyl chloride type, not only without impairing the desired properties, but with substantial enhancement of them.

The vinyl resins, e.g., methyl methacrylate, vinyl aromatic, acrylonitrile, etc., as industrial materials, are the most widely used thermoplastics. They lend themselves to commercial mass production, can be easily molded or shaped by heat and pressure, are cheap, and have many other excellent properties. However, their poor impact resistance is one of their major defects. In an effort to improve the impact resistance of vinyl plastics it has been proposed to incorporate or combine the vinyl resins with rubbery polymers such as butadiene and the like. In this way, thermoplastic resin compositions with excellent impact resistance have been obtained. A great many techniques for incorporating the vinyl resins with rubbery polymers or otherwise modifying the vinyl resins to improve their impact resistance are known (for example, see Japanese Patent Publications No. 18194–1960, No. 2286–1961, No. 8390–1964, No. 8668–1964, No. 7538–1956, No. 2791–1958, No. 8136–1959, No. 3534–1960, No. 9593–1961, No. 6720–1962, etc.). These prior art techniques all have been successful from the standpoint of improving impact resistance. However, the products so far obtained have always been found to be opaque, and their end-uses, naturally, have been greatly limited.

The present inventors have for some years past endeavored to produce thermoplastic vinyl resins provided both with an excellent impact resistance and with transparency. As a result they have become aware of an additional objectional phenomenon—discoloration—that inevitably occurs when rubbery polymers are incorporated in vinyl resins to increase the impact resistance. It is assumed to result from the deterioration of the rubbery polymer. Discoloration is not significant in case of non-transparent substances, but it is a major factor and detracts from the commercial value of a product in which transparency is desired.

During heat processing under the high temperatures required for extruding, injection molding, and other processing techniques, the rubbery component of the graft polymer tends to decompose easily, and thus the molded substances obtained are found to be highly subject to color deterioration. They also are often discolored and deteriorated when exposed to rays, oxygen, ozone, etc.

By this invention it is possible to manufacture thermoplastic butadiene-vinyl resin graft polymers that are superior both in respect to impact resistance and transparency as well as the capacity to resist deterioration due to discoloration. Thus, thermoplastic compositions are concurrently provided, on a high level, with characteristics, which have hitherto been considered to oppose each other, namely, impact resistance, transparency, and color deterioration resistance.

In essence, the improvement of the present invention embraces a novel procedure for producing a graft polymer of butadiene, acrylonitrile, methyl methacrylate and monoethylenically unsaturated hydrocarbon. Said procedure involves the formation of the graft polymer by polymerizing a rubbery butadiene polymer or a butadiene copolymer containing at least 50 percent butadiene in an aqueous dispersion and in the presence of formaldehyde sulfoxylate salt and peroxide with monomeric materials comprising acrylonitrile, methyl methacrylate, and monoethylenically unsaturated aromatic hydrocarbon, the improvement being further characterized in that the monomeric material is added to the dispersion in increments; in that more than 80 percent of the rubbery butadiene polymer particles are less than 0.1 $\mu$ in diameter during initial stages of polymerization; in that, for each 100 parts of polymerizable components, the amount of formaldehyde sulfoxylic salt added is from 0.5 to 10 parts and the amount of peroxide added is a catalytically effective amount up to three parts; in that the butadiene polymer or the butadiene copolymer in the graft polymer constitutes from 20 to 70 percent by weight thereof; and in that, of the total amount of monomeric material employed, the acrylonitrile constitutes from 5 to 60 percent, the methyl methacrylate from 5 to 50 percent, and the monoethylenically unsaturated aromatic hydrocarbon from 5 to 90 percent. The graft polymers so produced have a unique combination of properties in that they possess high transparency and resistance to impact and also an enhanced capacity to resist color deterioration at elevated temperatures in subsequent manufacturing operations.

Further blending the graft polymers produced by this process with vinyl chloride resins provides thermoplastic compositions in which the unique and desirable properties of the graft polymer and the vinyl chloride are enhanced.

Details of the process of the present invention will be more fully described below.

As used herein, the term butadiene polymer refers to rubbery polybutadiene and/or copolymers containing at least 50 percent of butadiene. As components of copolymers, other than butadiene, there may be used for example, styrene, vinyl pyridine, α-methyl styrene, acrylonitrile, vinyl octyl ether, vinyl acetate, vinyl butyrate, vinyl stearate, vinylidene chloride, acrylic acid, methacrylic acid, maleic acid, fumaric acid, methyl acrylate, methyl methacrylate, ethyl methacrylate, dimethyl maleate, dimethyl fumarate, chloroprene, isoprene, or isobutylene, etc. or mixtures thereof. The butadiene polymers can be used singly or in mixtures of two or more kinds. These are manufactured by the processes of emulsion, suspension, solution or other conventional methods of polymerization, and are used in the form of aqueous dispersions. Furthermore, these aqueous dispersions are characterized in that more than 80 percent of the dispersed polymer granules thereof are less than 0.1 $\mu$ in diameter.

As vinyl aromatic monomers may be mentioned such monoethylenically unsaturated aromatic hydrocarbons as styrene, α-methyl styrene, α-ethyl styrene or nucleus-replaced derivatives thereof (e.g., vinyl tolunene, isopropenyl toluene, chlorostyrene, etc.) or mixtures of two or more kinds thereof.

As formaldehyde sulfoxylic salts may be cited sodium formaldehyde sulfoxylate ($NaSO_2CH_2OH \cdot 2H_2O$), zinc formaldehyde sulfoxylate ($Zn(SO_2CH_2OH)_2$), etc., these being used singly or in mixtures of two or more kinds.

As peroxides may be mentioned organic and inorganic peroxides, such as cumenehydroperoxide, diisopropylbenzene hydroperoxide, tertiary butyl hydroperoxide, di-tertiary butyl peroxide, methylethyl ketone peroxide, lauroyl peroxide, benzoyl peroxide, ammonium persulfate, potassium persulfate, hydrogen peroxide, etc., these being used singly or in mixtures of two or more kinds.

As vinyl chloride resin to be used, may be mentioned polyvinyl chloride and/or copolymers of at least 70 percent vinyl chloride and 30 percent or less of monoolefinic monomers capable of copolymerization therewith. As such monoolefinic monomers, may be mentioned vinyl acetate, vinyl butyrate, vinyl stearate, vinylydene chloride, acrylic acid, methacrylic acid, maleic acid, fumaric acid, methyl acrylate, methyl methacrylate, dimethyl maleate, dimethyl fumarate, acrylonitrile, vinyl octyl ether, styrene, isobutylene, etc., these being used singly or in the form of a mixture of two or more kinds. These are polymerized by the methods of suspension, solution or other conventional methods.

The amounts, respectively, of formaldehyde sulfoxylic salts and peroxides to be used vary according to the kind, concentration and temperature of the aqueous dispersion of butadiene polymer used. However, the amount should desirably be such that the stability of the aqueous dispersion may not be impaired and the appearance and status of such dispersion may be retained until polymerization ends, and yet it must be large enough to ensure satisfactory results. The range, in relation to each 100 parts of polymerizable components i.e., from 20 to 70 parts of the butadiene polymer plus from 80 to 30 parts of the sum of the monomers), is found to be 0.5 to 10 parts of formaldehyde sulfoxylic salts, preferably from about two parts to about five parts, and catalytically effective amounts, but less than three parts, of peroxides, usually 0.1 to 1.5 parts. If the amount of formaldehyde sulfoxylic salts is less than 0.5 part, as is usually the case in conventional emulsifying polymerization, practically no effect will be produced in respect to impact resistance.

The graft polymer may be manufactured by the following method: in the presence of 0.5-10 parts of formaldehyde sulfoxylic salts and not more than three parts of peroxides, (a) 80 to 30 parts of monomers, consisting of (i) vinyl aromatic 5-90 percent, (ii) methyl methacrylate 5-50 percent and (iii) acrylonitrile, 5-60 percent, are added to (b) 20 to 70 parts of dispersed granules in the aqueous dispersion of the aforesaid butadiene polymer, more than 80 percent of the granules of which are below 0.1 $\mu$ in diameter. Thus coagulation and swelling of the dispersed granules are stimulated, and, at the same time, they are made to polymerize.

For the addition of the monomers to the butadiene polymer granules for polymerization, the total amount or part thereof of acrylonitrile and/or methyl methacrylate (which are water soluble monomers) may be added first, in several successive increments, and, after this polymerization is substantially finished, the vinyl aromatic and a mixture of the remainder of acrylonitrile and/or methyl methacrylate may be added and polymerized. Alternatively, a mixture of the total amount of these three monomers may be added in increments for polymerization. By either of these two processes, an excellent compound may be obtained.

If desired, a current of an inert gas, such as nitrogen, or the like may be used. When emulsion polymerization techniques are used, the mixture may be heated to promote coagulation and enlarging of the particles. The aqueous dispersion is agitated at an appropriate temperature. Addition of any suitable polymerization initiator, polymerization regulator, latex stabilizer, or the like, is allowable.

When polymerization of monomers to the polymer granules is substantially completed, polymerization is stopped, and the aqueous dispersion is salted out and filtered, and its solid content is dried, and, thus, the desired graft polymer is obtained.

The graft polymer thus obtained is a thermoplastic material that is highly resistant to impact, has high transparency, and does not discolor during extrusion, injection molding, or similar manipulative treatment under heat and pressure. These properties of the graft polymer are still further enhanced by blending it with vinyl chloride resin, with which it is freely compatible. The resinous constituents are mixed by using a roll blender, Banbury mixer, or extruder, or may be mixed in the state of an aqueous dispersion, to obtain the desired thermoplastic vinyl composition. If desired, a heat stabilizer, light stabilizer, aging preventive, lubricant, pigment, dye, etc., may be added in the usual manner.

Below are described the more salient functions and effects of this invention.

1. At least 80 percent of the butadiene granules in the aqueous dispersion to be used are required to be less than 0.1 $\mu$ in diameter. Besides, in order to have the mixture of vinyl aromatic, methyl methacrylate and acrylonitrile polymerized to these granules, the polymerizing process is to be commenced while more than 80 percent of these granules are less than 0.1 $\mu$ in diameter. This is essential in order to obtain the desired transparency.

When 20 percent or more of the granules used are larger than 0.1 $\mu$ in diameter, the compound obtained, while superior in impact resistance, will be found inferior in transparency, as indicated in Table 1.

TABLE 1.—RELATION BETWEEN DIAMETER OF BUTADIENE POLYMER GRANULES AND CHARACTERISTIC VALUES OF GRAFT POLYMERS PRODUCED THEREFROM

|  | This invention | Control |
|---|---|---|
| Size of butadiene polymer granules | 99 | 7 |
| Amount of granules less than 0.1$\mu$ in diameter (percent) | | |
| Transparency: | | |
| Coefficient of transmission of visible light (percent)[1] | 77 | 38 |
| Haze value (percent)[1] | 6.5 | 29.5 |
| Transparency as macroscopically observed | (3) | (4) |
| Impact resistance (Charpy value)[2] (with notch 20° C.) kg. cm./cm.[2] | 25.1 | 16.5 |

[1] Transparency JIS K-6714.
[2] Impact strength JIS K-6745.
[3] Transparent.
[4] Not transparent.

Remarks:
a. An aqueous dispersion containing a copolymer, made up of butadiene, 76.5% and styrene, 23.5% was used. However, in this invention and the control, the size of the dispersed granules was different, granules of larger size than stipulated being used in the control.
b. The graft polymer was obtained by adding a solution consisting of hydrate of sodium formaldehyde sulfoxylate, three parts, and water, 30 parts, and peroxides, one part, to an aqueous dispersion containing butadiene copolymer, 25 parts, and then adding a mixture of acrylonitrile, 25 parts, methyl methacrylate, 25 parts, styrene, 25 parts, and cumene hydroperoxides, 0.3 parts, and, agitating and polymerizing the same at 60° C.

If a resin of the polyvinyl chloride type is blended with a butadiene monoolefinic graft polymer produced in like manner to the specimen referred to in Table 1 above, the contrast becomes even more striking in comparison with the control, as seen below in Table 2.

TABLE 2.—RELATION BETWEEN DIAMETER OF BUTADIENE POLYMER GRANULES AND VARIOUS CHARACTERISTICS OF POLYVINYL CHLORIDE/BUTADIENE MONOOLEFINIC FINAL RESINS PRODUCED THEREFROM

| Items | This invention | Control |
|---|---|---|
| Amount of granules less than 0.1$\mu$ in diameter (percent) | 99 | 7 |
| Transparency: | | |
| Coefficient of transmission of visible light (percent) | 80.3 | 11.2 |
| Haze value (percent) | 5.4 | 43.7 |
| Macroscopic observation | (1) | (2) |
| Impact resistance (kg. cm./cm.[2]): | | |
| 20° C | (3) | (2) |
| −30° C | 7.2 | 6.6 |

[1] Transparent. [2] Not transparent. [3] Above 60.

Remarks:
a. To 160 parts of aqueous dispersion containing (a) a copolymer consisting of (i) butadiene, 75% and (ii) styrene, 25%, (b) three parts of sodium formaldehyde sulfoxylate (2H$_2$O) and (c) one part of cumene hydroperoxide were added, and, right afterwards, a mixture of (iii) styrene, 30 parts, (iv) acrylonitrile, 10 parts, (v) methyl methacrylate, 20 parts and (vi) cumene hydroperoxide, 0.4 part, was successively added for 6-hour polymerization, and a graft polymer thus obtained was used.
b. The above-mentioned graft polymer, 30 parts, along with vinyl chloride resin (degree of polymerization....1,000), 70 parts, and dibutyl zinc mercaptide stabilizer, three parts, was kneaded for 10 minutes at 90° C., and the test piece thus obtained was used.

c. Impact resistance is represented in Charpy value (JIS . . . K-6745). Transparency is represented in value at 20° C. (JIS . . . K-6714).

2. Polymerization is commenced in the presence of formaldehyde sulfoxylic salts and peroxides, in aqueous dispersion. Nothing definite is yet known about the mechanism of these functions. It is assumed, however, that the three factors cited below play an important part therein:

a. Formaldehyde sulfoxylic salts remain neutral in water kept at room temperature and exhibit no tendency towards coagulation of the butadiene particles. However, in co-existence with peroxides, they gradually decompose to stimulate coagulation and swelling of the dispersed butadiene granules, in parallel with graft polymerization consequent upon the addition of monomers. The action may be enhanced by adding the monomer or monomers in the form of an aqueous solution. The resin thus obtained will show an excellent impact resistance, at the same time that it retains transparency. In contrast, if an aqueous solution of sodium bisulfite and formaldehyde is mixed with an aqueous dispersion of butadiene polymers, the pH will at once drop, and violent coagulation of the dispersed granules will ensue, with the result that the aqueous dispersion is deprived of its status as such, and, eventually, uniform stable polymerization will be made impossible.

b. The sulfoxylic salt and peroxide act on the butadiene polymer and assist in carrying out crosslinking smoothly. As a result, the resin obtained is provided with a high impact resistance.

c. Formaldehyde sulfoxylic salts and peroxides continue to exist before, during and after polymerization, and destroy and eliminate the color deteriorating elements. This results in an excellent color deterioration resistance of the product thus obtained.

As described above, in the coexistence of formaldehyde sulfoxylic salts and peroxides, impact resistance, transparency and color deterioration resistance are imparted smoothly and effectively, through the three functions mentioned above.

Particulars of such mechanism still remain unclarified, but it is assumed that these functions are responsible for the good impact resistance, transparency and color deterioration resistance carried by the compound thus obtained. The circumstances herein are indicated in Table 3.

TABLE 3. — EFFECTS OF FORMALDEHYDE SULFOXYLIC SALTS AND PEROXIDES

| Items | This invention | Control 1 | Control 1 | Control 3 |
|---|---|---|---|---|
| Stability of aqueous dispersion | Stable | Stable | (1) | (2) |
| Amount of granules less than 0.1µ in diameter after completion of polymerization (percent) | 57 | 95 | 68 | 0 |
| Impact resistance (kg. cm./cm.²): | | | | |
| 20° C. | (3) | (3) | (3) | |
| -30° C. | 7.2 | 6.7 | 10.2 | |
| Transparency: Coefficient of transmission of visible light (percent) | 80.3 | 81.1 | 72.5 | |
| Heat discoloration test (min.) | 60 | 45 | 45 | |

Remarks:
1 Slightly unstable.
2 Unstable (completely coagulated and continuation of polymerization is impossible).
3 Above 60.

a. The experimental conditions were exactly the same as under "This invention" in the case of Table 2.

b. Under the conditions of polymerization of the graft polymer, sodium formaldehyde sulfoxylate $2H_2O$, three parts, and cumene hydroperoxide, one part, were used for the Item of "This invention"; cumene hydroperoxide, one part, was used for the Item of "Control 1"; sodium chloride, two parts, and cumene hydroperoxide, one part, were used for the Item of "Control 2"; and, sodium bisulfite, two parts, and cumene hydroperoxide, one part, were used, respectively, for the Item of "Control 3."

c. The impact resistance is represented by the value obtained by the test piece roll-kneaded for 10 minutes at 180° C. in the case of Control 1, and similarly roll-kneaded for 10 minutes at 160° C. in the case of Control 2, respectively.

d. The coloring test was represented in terms of the time (minutes) taken until the test piece began to be discolored after it was fed into the open oven and heated up to 190° C.

3. With respect to formation of the butadiene graft polymer, as such, the percentages of acrylonitrile, methyl methacrylate and vinyl aromatic, respectively, exert a great effect on the action of stable and satisfactory coagulation and enlarging of dispersed granules, and on impact resistance, transparency and color deterioration resistance of the butadiene graft polymer obtained. In order to retain the superior characteristics of these three agents, an appropriate range of percentages should be set. For example, the optimum percentages will be 5 to 90 percent for vinyl aromatic; 5 to 50 percent for methyl methacrylate; and 5 to 60 percent for acrylonitrile. When the amount of methyl methacrylate exceeds 50 percent of the total monomer content, impact resistance will deteriorate and the dispersion will be deprived of stability, while, when the amount of vinyl aromatic drops below 5 percent or exceeds 90 percent of the monomer content, transparency will be impaired. In case the amount of acrylonitrile falls below 5 percent, impact resistance will be adversely affected, and, in case it exceeds 60 percent, the dispersion becomes unstable while resistance to discoloration will deteriorate. Similar impairment of the desired properties of the vinyl chloride/butadiene resin will be noted where the stated ranges of monomer addition to the butadiene polymer are not observed. In addition, when the percentage of methyl methacrylate drops below 5 percent, the product obtained becomes bluish and turbid and color deterioration resistance is reduced, whereas, when the percentage exceeds 50%, it becomes yellowish and turbid, indicating impaired transparency.

Below, this invention will be explained in reference to specific embodiments thereof.

EMBODIMENT 1

Preparation of the butadiene graft polymer

To 200 parts of an aqueous dispersion, containing 25 parts of butadiene polymers (made up of butadiene, 75%; and styrene, 25%) 90 percent of the granules of which were smaller than 0.1 µ in diameter, a solution consisting of three parts of a hydrate of sodium formaldehyde sulfoxylate and 30 parts of water, and one part of cumene hydroperoxide, was added at 60° C. under a nitrogen current while the mixture was being agitated. After 1 hour agitation, a mixture of styrene, 25 parts, methyl methacrylate, 25 parts, acrylonitrile, 25 parts and cumene hydroperoxide, 0.3 part, was successively dropped for 4 hours. Agitation was continued for another 2 hours, and then, polymerization was ended. Through the processes of salting out, filtering and drying, 98 parts of powdered resin were obtained. How the dispersed granules were swollen in parallel with the progress of polymerization is shown in Table 4.

TABLE 4

| Items | Amount of granules, smaller than 0.1 µ |

| | in diameter (%) |
|---|---|
| Dispersion of butadiene polymer material | 99 |
| Immediately prior to addition of monomers | 98 |
| In the course of addition of monomers (after 3 hours had elapsed) | 72 |
| Immediately after addition of monomers (after 5 hours had elapsed) | 61 |
| After end of polymerization | 55 |

The resin thus obtained was roll-kneaded for 10 minutes at 160° C. and pressed for 30 minutes at 170° C. From the test piece thus produced, the results of Table 5 were obtained.

TABLE 5

| | |
|---|---|
| Impact strength Charpy value (kg. cm./cm.²) with notch 20° C | 25.1 |
| Tensile strength (kg./cm.²) | 379 |
| Elongation (percent) | 55 |
| Hardness (Rockwell) | R101 |
| Thermal deformation temperature (° C.) | 75 |
| Flow (cc./sec.) | 4.5×10⁻² |
| Transparency: | |
| By macroscopic observation | Transparent |
| Coefficient of transmission of visible light (percent) | 77 |
| Haze value (percent) | 6.5 |
| Discoloration resistance (minutes) | 80 |

Remarks:
a. Tensile strength-elongation (20°C.) ASTM D638–60T
Hardness ASTM D785–60T
Thermal deformation temperature
(18.6 kg/cm²) ASTM D648–56
Flow (1 × 10 mm nozzle Koka Type
180° C. 150 kg/cm²) flow tester
b. Discoloration Test:
The test piece is fed into the open oven and heated to 190° C., and the time taken until it begins to be discolored is represented in terms of time (min).

EMBODIMENT 2

Preparation of the Butadiene Graft Polymer (Alternative Procedure)

Two-hundred parts of an aqueous dispersion containing 30 parts of butadiene granules, 90 percent of which were smaller than 0.1 μ in diameter, was kept at 50° C. under a nitrogen current and in a state of agitation, and, to the same, a solution consisting of a hydrate of sodium formaldehyde sulfoxylate, five parts and water, 50 parts, and cumene hydroperoxide, 0.5 part, were added. After the mixture was agitated for 10 minutes, 98° percent of the dispersed granules were found to be less than 0.1 μ in diameter. After this, acrylonitrile, 10 parts, were successively dropped for an hour, and, then, styrene, 30 parts, methyl methacrylate, 20 parts, acrylonitrile, 10 parts, and cumene hydroperoxide, 0.4 part, were successively dropped for 3 hours. Agitation was ended. Through the processes of salting out, filtering and drying, 99 parts of powdered resin were obtained.

This resin was roll-kneaded for 10 minutes at 160° C., and pressed for 30 minutes at 170° C., and, from the test piece thus produced, the test results of Table 6 were obtained.

TABLE 6

| | |
|---|---|
| Impact strength Charpy value (kg. cm./cm.²) with notch 20° C | 34.5 |
| Tensile strength (kg./cm.²) | 327 |
| Elongation (percent) | 65 |
| Hardness (Rockwell) | R92 |
| Thermal deformation temperature (° C.) | 74 |
| Flow (cc./sec.) | 2.0×10⁻² |
| Transparency: | |
| Macroscopic observation | Transparent |
| Coefficient of transmission of visible light (percent) | 70 |
| Haze value (percent) | 9 |
| Color deterioration resistance (min.) | 80 |

Remarks:

The conditions of measurement were exactly the same as in the tests of Embodiment 1.

EMBODIMENT 3

Preparation of Butadiene/Vinyl Chloride Resin

To 200 parts of an aqueous dispersion containing 42 parts of copolymer granules, consisting of butadiene 75 percent and styrene 25 percent (90 percent of the granules thereof being less than 0.1 μ in diameter), a solution consisting of 3 parts of sodium formaldehyde sulfoxylate·2H₂O and 30 parts of water, and one part of cumene hydroperoxide, were added at 60° C. under a nitrogen current, while agitating. Moreover, 10 parts of acrylonitrile were added in increments during 1 hour, whereupon a mixture consisting of styrene, 30 parts, methyl methacrylate, 18 parts, and peroxide, 0.3 part, was successively poured, and the resulting mixture was agitated for 6 hours at 60° C.

Moreover, it was agitated for another 2 hours, and then the temperature was dropped, and an emulsified product of two parts of ditertiary butyl hydroxyl toluene, an aging inhibitor, was added. Then polymerization was suspended.

Table 7 indicates that the diameter of dispersed granules was made to change before, during and after polymerization.

TABLE 7

| Periods | Amount of granules less than 0.1 μ in diameter (%) |
|---|---|
| Immediately prior to addition of monomers | 98 |
| During addition of monomers (when 3 hours have elapsed) | 91 |
| Immediately before end of addition of monomers | 64 |
| After termination of agitation | 57 |

To the dispersion just coming through polymerization, table salt and hydrochloric acid were added, and the mixture was salted out, filtered and its solid content was dried. Ninety-eight parts of graft polymer granules were thus obtained.

Fifteen parts of these graft polymer granules and 85 parts of vinyl chloride resin (degree of polymerization: 1,000) were roll-kneaded for 10 minutes at 180° C. and pressed for 30 minutes at 190° C. and thus the test piece was produced. The results of testing the product thus obtained are shown in Table 8.

TABLE 8

| Items | Results |
|---|---|
| Impact resistance (kg. cm./cm.²): | |
| 20° C | Above 90. |
| −30° C | 7.2. |
| Tensile strength (kg. cm./cm.²) | 482. |
| Rockwell Hardness | 112. |
| Heat-deformation temperature (° C.) 18.6 kg./cm.² | 68.4. |
| Transparency: | |
| Coefficient of transmission of visible light (percent) | 80.3. |
| Haze value (percent) | 5.4. |
| Heat-discoloration test (min.) | 60. |

Remarks:
| | | |
|---|---|---|
| Tensile strength | JIS | K–6745 |
| Transparency | JIS | K–6714 |
| Hardness (Rockwell) | ASTM | D 785 |
| Heat-deformation temperature | ASTM | D 648 |

EMBODIMENT 4

Preparation of Butadiene/Vinyl Chloride Resin, Alternative Procedure

Two-hundred parts of an aqueous dispersion containing 30 parts of butadiene granules, 84 percent thereof being less than 0.1 μ in diameter, were heated and agitated at 40° C., to which were added 15 parts of water and 5 parts of a hydrate of sodium formaldehyde sulfoxylate 2H₂0 followed by the addition of one part of cumene hydroperoxide. Moreover, 10 parts of acrylonitrile were added in increments during 1 hour for polymerization. After the termination of this polymerization, a mixture of styrene, 37 parts, methyl methacrylate, 23 parts, and cumene hydroperoxide, 0.5 part, was poured into the kettle while polymerization was continued for 7 hours.

After the completion of polymerization, the mixture was further heated and agitated for 2 hours at 40° C., and then the temperature was made to drop, and an emulsified product of 2 parts of ditertiary butyl hydroxyl toluene was added. Then polymerization was suspended.

How the diameter of the granules in the dispersion changed over the various stages of the above process is shown in Table 9.

TABLE 9

| Times of Measurement | Amount of granules, less than 0.1 μ in diameter (%) |
|---|---|
| Immediately after commencement of addition of acrylonitrile | 84 |
| After termination of addition of acrylonitrile | 66 |
| After elapse of 3.5 hours following commencement of dropping of methyl methacrylate-styrene | 45 |
| After termination of dropping of methyl methacrylate-styrene | 21 |
| After end of polymerization | 18 |

Table salt and hydrochloric acid were added to the dispersion, and the mixture was salted out, filtered, and its solid content dried. Thus a powdered polymer, 96 parts, was obtained. With 70 parts of the polymer thus obtained, 30 parts of a copolymer, consisting of vinyl chloride, 95 percent, and vinyl acetate, 5 percent (degree of polymerization: 1,500) were mixed, and butyl zinc mercaptan stabilizer, three parts, and butyl stearate, one part, were added. The mixture was then kneaded for 10 minutes at 180° C. by using rolls, and was pressed for 30 minutes at 190° C., in order to produce a test piece.

The test results obtained with this test piece were as shown in Table 10, below.

TABLE 10

| Items | | Results |
|---|---|---|
| Impact Resistance (kg cm/cm²) | 20°C. | Above 60 |
| (Charpy values) | −30°C. | 6.5 |
| Tensile strength (kg cm/cm²) | | 403 |
| (Rockwell) Hardness | | R105 |
| Heat-deformation temperature (°C.) 18.6 kg/cm² | | 73.5 |
| Coefficient of transmission of visible light (%) | | 65.1 |
| Haze value (%) | | 9.7 |
| Discoloration test (min.) | | 60 |

Remarks:

The test conditions were identical with those in Embodiment 3.

The butadiene graft polymers of this invention are, like certain other rubbery butadiene resins heretofore known, freely compatible with the vinyl chloride polymers indicated herein.

Significant improvement in impact resistance is attained with as small a ratio of butadiene graft polymer as 3 percent. As this proportion is increased, in order to maximize impact resistance, the capacity to resist color deterioration becomes more striking. Even as small a ratio as 30 percent of vinyl chloride polymer, on the other hand, will increase the transparency of the final resin.

We claim:

1. In a process of making a thermoplastic graft polymer from butadiene, acrylonitrile, methyl methacrylate and monoethylenically unsaturated aromatic hydrocarbon, the improvement whereby the final resin not only possesses high transparency and resistance to impact, but also possesses an enhanced capacity to resist color deterioration at elevated temperatures under subsequent manufacturing, said process including the formation of the graft polymer by polymerizing with a rubbery butadiene polymer in an aqueous dispersion and in the presence of formaldehyde sulfoxylate salt and peroxide monomeric material comprising acrylonitrile, methyl methacrylate, and monoethylenically unsaturated aromatic hydrocarbon, the improvement being further characterized in that the monomeric material is added in increments; in that more than 80 percent of the rubbery butadiene polymer particles are less than 0.1 μ in diameter during initial stages of polymerization; in that, for each 100 parts of polymerizable components, the amount of formaldehyde sulfoxylic salt added is from 0.5 to 10 parts and the amount of peroxide added is a catalytically effective amount up to three parts; in that the butadiene in the graft polymer does not exceed 60 percent by weight thereof; and in that, of the total amount of monomeric material employed, the acrylonitrile constitutes from 5 to 60 percent, the methyl methacrylate from 5 to 50 percent, and the monoethylenically unsaturated aromatic hydrocarbon from 5 to 90 percent.

2. The process of claim 1 wherein at least a portion of the acrylonitrile is incorporated in the dispersion containing the polybutadiene particles, the sulfoxylate and the peroxide prior to the addition of the methyl methacrylate and monoethylenically unsaturated aromatic hydrocarbon.

3. The process of claim 1 wherein the acrylonitrile, methyl methacrylate and monoethylenically unsaturated aromatic hydrocarbon are added sequentially and in increments.

4. The process of claim 1 wherein the monoethylenically unsaturated aromatic hydrocarbon is styrene.

5. The process of claim 1 wherein the rubbery butadiene polymer is a copolymer of butadiene and styrene.

6. The process of claim 1 wherein the amount of formaldehyde sulfoxylic salt employed is from about two parts to about five parts in relation to each 100 parts of the total weight of the monomeric and polymeric constituents to be used.

7. The process of making a thermoplastic composition whereby the final resin not only possesses high transparency and resistance to impact, but also possesses an enhanced capacity to resist color deterioration at elevated temperatures under subsequent manufacturing, by blending a vinyl chloride polymer containing at least 70 percent polyvinyl chloride with a graft polymer made in accordance with claim 1.

8. The process of making a thermoplastic composition whereby the final resin not only possesses high transparency and resistance to impact, but also possesses an enhanced capacity to resist color deterioration at elevated temperatures under subsequent manufacturing, by blending a vinyl chloride polymer containing at least 70 percent polyvinyl chloride with a graft polymer made in accordance with claim 5.

9. The graft polymer produced by the method of claim 1.

10. The thermoplastic composition produced by the method of claim 7.

* * * * *